United States Patent [19]
Drake et al.

[11] 3,906,966
[45] Sept. 23, 1975

[54] FILM HANDLING DEVICE

[75] Inventors: Gerald E. Drake; Donald J. Mitchell, both of St. Paul, Minn.

[73] Assignee: Minnesota Mining and Manufacturing Company, St. Paul, Minn.

[22] Filed: Jan. 2, 1974

[21] Appl. No.: 429,540

[52] U.S. Cl.................. 134/46; 242/56 R; 242/57; 242/71.7; 242/77.1; 354/314
[51] Int. Cl.² ..................... G03D 3/00; B65H 35/04
[58] Field of Search.......... 242/77.1, 71.7, 56 R, 57, 242/55; 134/46; 354/314, 313, 316, 341, 354/342, 310

[56] References Cited
UNITED STATES PATENTS
3,795,370   3/1974   Dean................................. 242/77.1
FOREIGN PATENTS OR APPLICATIONS
657,311   9/1951   United Kingdom................. 242/71.7

Primary Examiner—George F. Mautz
Attorney, Agent, or Firm—Alexander, Sell, Steldt & DeLaHunt

[57] ABSTRACT

A film handler permitting the daylight loading of a sensitized, exposed strip of 35mm film into a film processor. The end of the film is withdrawn from the film cassette and connected to a driven take-up reel. The cover of the device may then be closed and the film is withdrawn from the cassette and upon reaching the end of the film the film is placed under tension pulling the support for the film cassette against biasing means for momentarily triggering a circuit to operate the knife, cutting the end of the film from the cassette and permitting the continued rotation of the take-up in a film developing reservoir.

8 Claims, 4 Drawing Figures

FILM HANDLING DEVICE

BACKGROUND OF THE INVENTION

1. Field of the Invention

This invention relates to a film handling device for a film processor. In one aspect this invention relates to an improved film handling device for a film processor used for developing individual rolls of 35mm film which film handler permits the film to be inserted into the processor under normal lighting.

2. Description of the Prior Art

The device of the present invention differs from other film handling devices in that the present system permits individual rolls of exposed film to be inserted into the processor while still in the film cassette into which the film has been rewound, except for its free end. The free end of the film is connected to a take-up reel and the cassette is placed in a receptacle. The take-up reel is also a barrel for supporting the film and affording the rotation of the film in a reservoir of chemical to bath develop the latent image. The difficulty in processing individual strips of film is mainly economic in that it is necessary to have a dark room in which to open the cassette and place the film in the processor. Processing normally requires threading the film through the processing unit. This was generally done in connection with other lengths of film secured together and wound on a reel and then threaded through the processor as is done commercially. For the development of individual strips of film the same is now usually done in a dark room by removing the film from a cartridge and winding it in a basket which permits placement of the film first in one processing chemical and then another, moving the film up and down in the tanks. Other developers or processors are known but a dark area or room is necessary when placing the film in the processor. The device of the present invention permits the film to be loaded into a processor in normal room light and then the processing unit is closed up, making the developing area light tight and the film is automatically withdrawn from the film cassette and placed into the processor. When the end of the film is reached the film is automatically cut from the spool in the film cassette and the film is processed in the processor by chemicals. The take-up reel provides a convenient method of film containment for processing.

SUMMARY OF THE INVENTION

This invention relates to a film handling device comprising a receptacle or well for receiving the film cassette with the end of the film protruding from the cassette. The support for the cassette is movably mounted on a frame which also supports a cutting device and a film processing reservoir. A rotatably driven take-up reel in the form of a film basket is supported in the reservoir wherein the convolutions of the film are radially spaced permitting developing solutions to properly and thoroughly wash the film for development.

The take-up reel provides a drive for the film to draw it from the cassette into the processor. As the reel accepts the strip of film it places tension in the strip of film pulling the film cassette and its support toward the take-up reel. The receptacle is biased away from the take-up reel and when the cassette and the film support are pulled against the biasing means a switch is actuated to close a circuit actuating the cutting device. The cutting device is operated when a solenoid is energized which drives a cutting knife through the film to sever the strip of film from the spool in the cassette.

DESCRIPTION OF THE DRAWING

The present invention will be more fully described with reference to the accompanying drawing wherein.

Figure 1:
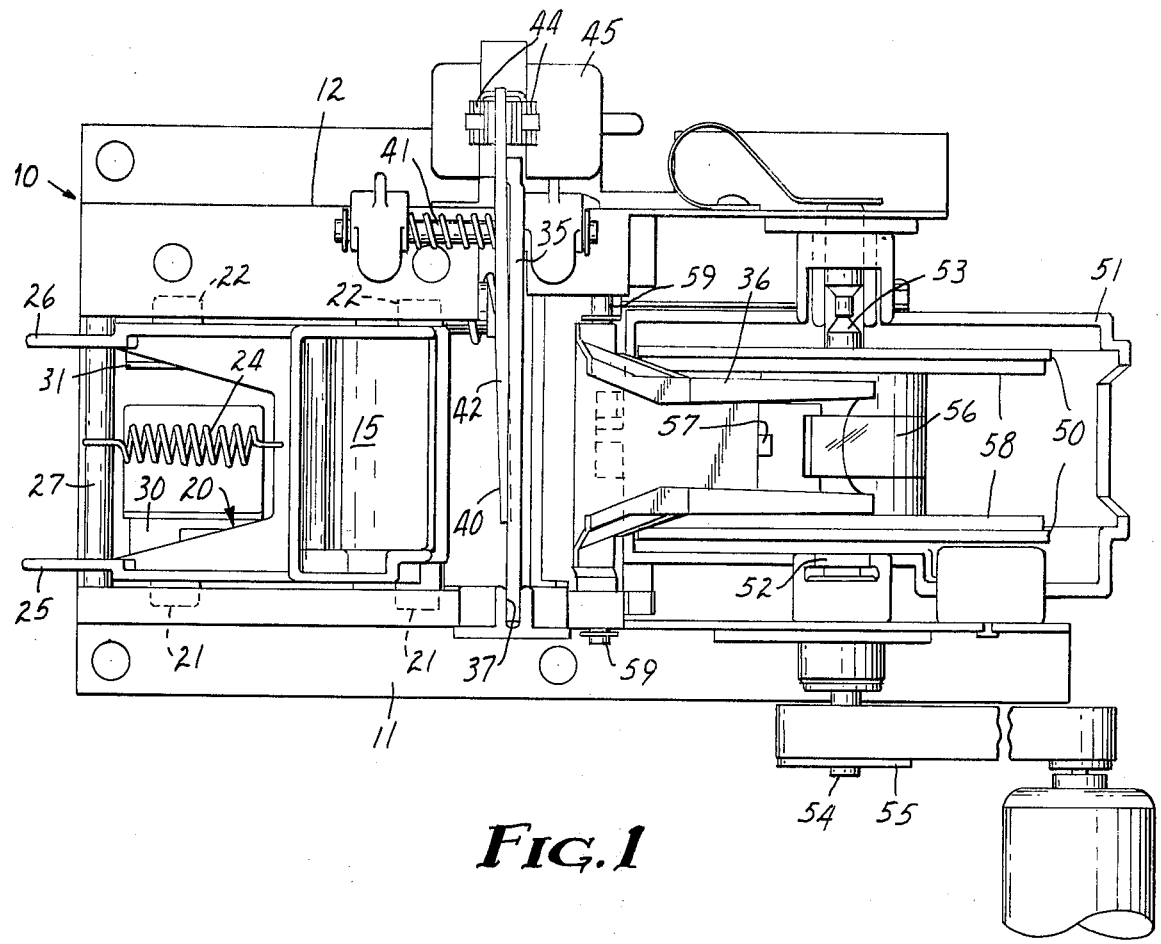
FIG. 1 is a plan view of a film handling device constructed according to the present invention.

The film handling device of the present invention is adapted for use in a film processor for the processing of exposed film. It is particularly adapted to handle the feeding of exposed film into a processor from the ubiguitous 35mm film cassette. The present invention permits the film cassette to be removed from the camera and taken to the processor and placed in the processor for processing in the normal room light.

The end of the film must extend from the film cassette. The film is then connected to a take-up reel. The film is then ready to be processed and the processor is closed, enclosing the device of the present invention in a light-tight housing. The film is then drawn from the cassette and a cutter then cuts the strip of film from the spool of the cassette. The take-up reel in the film handler illustrated has a structure suitable for bathing the film in processing chemicals and is structured like a basket used for manual film processing.

The device illustrated comprises a frame 10 including transversely spaced side plates 11 and 12 supported in parallel positions from a bottom plate 13. At one end of the frame 10 is positioned a receptacle or well 15 in which a film cassette 16 is to be placed. This well 15 is formed in a frame 20 which is movably supported at its transverse edges for sliding movement relative to the frame 10. Frame 20 has ears 21 and 22 extending laterally from opposite sides thereof which are received between frame members on the frame 10 which define guides for the ears and permit sliding reciprocatory movement of the frame 20. The frame 20 is biased to a rearward position in the guide members by a spring 24 which is positioned between bifurcated legs 25 and 26 of the frame 20 and which legs 25 and 26 terminate with a hook fitting over a rod 27 at the end of the frame 10. The hooks determine the extent of movement for the frame 20 against the bias of the spring 24.

Figure 2:
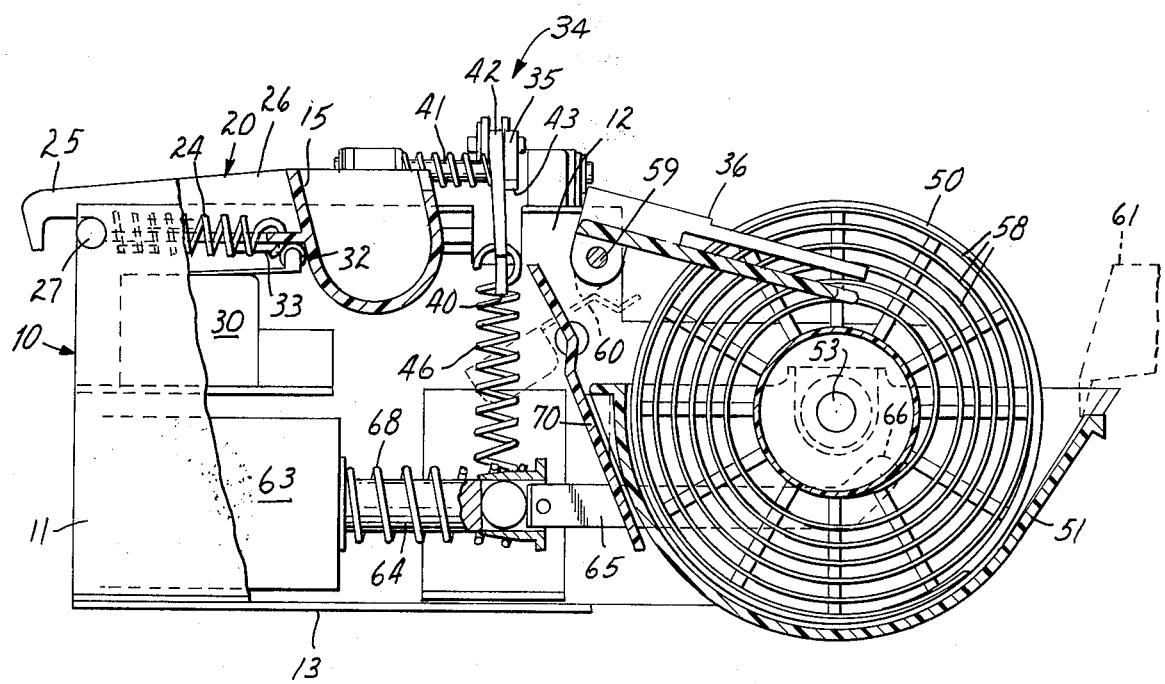
FIG. 2 is a side elevational view, with a greater part in vertical section to show the interior members.
Figure 3:
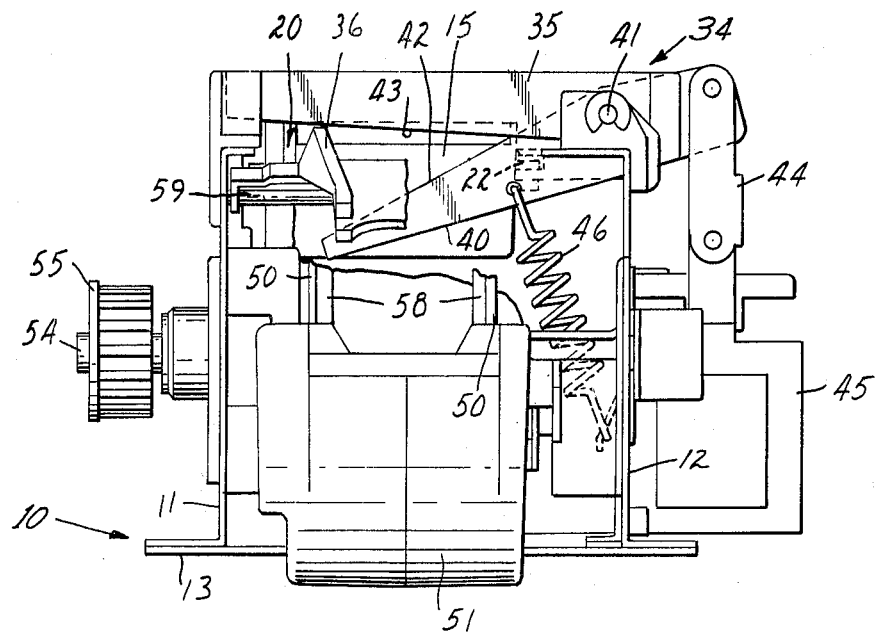
FIG. 3 is a right end view of the device of FIG. 1.

A pair of switches 30 and 31 are disposed beneath the legs 25 and 26 of the frame 20 and each have an upwardly extending operating arm and cam follower 32 biased into engagement with the undersurface of the arms 25 and 26 respectively. Depending from the frame 20, as best shown in FIG. 2, above each switch is a sensing member or projection 33 which operates the switch arm to actuate the switches in response to the completion of the winding of the film on the take-up reel. These switches 30 and 31 are thus actuated in response to movement of the frame 20 relative to the frame 10.

The cutter mechanism, generally designated by the numeral 34, comprises a first cutter bar 35 which is pivotally mounted above the film path. The bar 35 is pivoted on a pin 41 to permit threading of the film along the path from the cassette in the well 15 into a tape guide 36 positioned beyond the cutter mechanism. Bar 35 bridges the frame side plates and is retained at its free end in a slot 37 supported on the side wall 11. In this position the cutter bar 35 is stationary. A second cutter bar 40 is pivotally mounted about the pin 41 and is formed with a cutting edge 42 which cooperates with a cutting edge 43 of the bar 35. The cutting bar 40 forms a scissors-like cutting member for the film and extends past the pivot arm 41 where the extended free end is connected through a link 44 to a solenoid 45 operated by the switch 30. The cutter bar 40 is biased to a spaced position from the bar 35 by a spring 46 which retracts the cutter bar upon de-energization of the solenoid 45. Solenoid 45 is of course de-energized in response to the film being cut and the frame 20 returning under the bias of the spring 24 to its rearward position, allowing the switch 30 to open as the switch arm is returned to its normal raised position.

Figure 4:
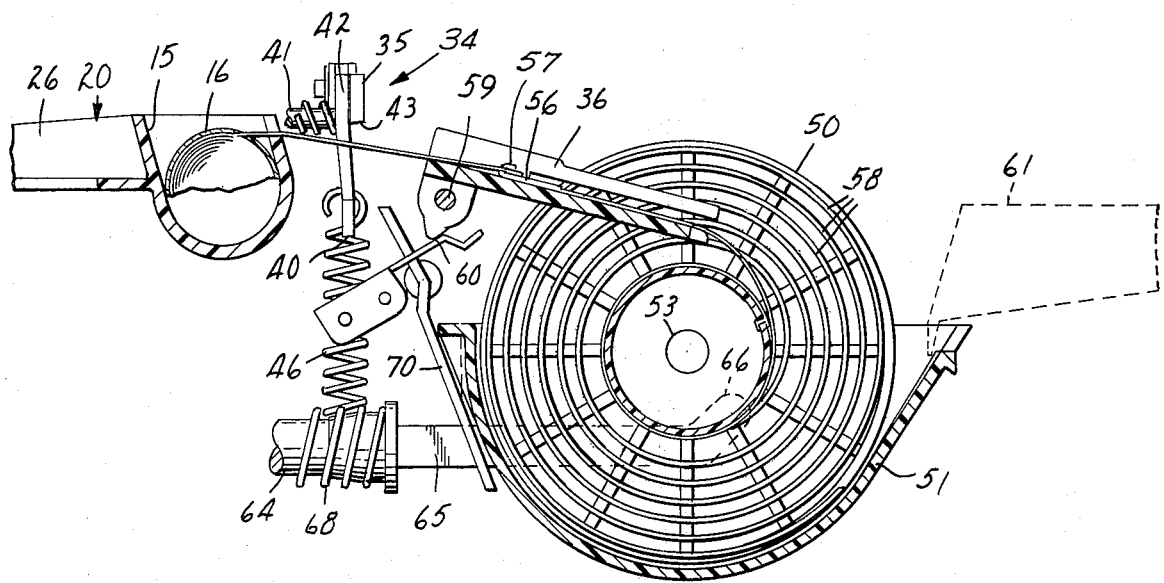
FIG. 4 is a fragmentary view showing the operating elements of the device.

A film take-up reel 50 is mounted in a reservoir 51 supported at the end of the frame 10 opposite the frame 20. The take-up reel 50 is rotatably mounted on trunions 52 and 53 which are supported in journals and the trunion 52 is keyed to a drive shaft 54 which in turn carries a drive sprocket 55 for a timing belt driven from the drive sprocket of a suitable electric motor. Connected to the hub of the reel 52 is a leader 56 as shown in FIG. 4. The leader 56 is formed with a hook 57 which may be attached to the end of the film withdrawn from the cassette 16. As the take-up reel 50 is driven the film is withdrawn from the cassette 16 and it is wound in radially spaced convolutions into the take-up reel 50. The flanges of the take-up reel 50 are formed with helically wound thin axially extending radially spaced surfaces 58 which are joined by radially extending spokes. The spokes or spoke-like members are circumferentially spaced and retain the film on the surfaces 58 of the two flanges. The film guide 36 is pivotally mounted on a shaft 59 and is initially positioned closely adjacent the hub of the reel 50 under the influence of a leaf spring 60. The guide 36 is in the form of a chute and places a bow into the film to guide the leading end of the wide film into the inner convolution of the opposed helical surfaces 58, and thus as the take-up reel continues to be driven the film threads into the take-up reel and onto the surfaces 58 to be wound convolutely therein. The spacing of the film windings permits the same to be bathed in the processing fluid positioned in the reservoir 51.

As the take-up reel 50 winds the length of film onto the reel 50 the film guide 36 moves from an inner position to the outer position where it is held by the spring 60, placing the last portion of the film on the outermost portion of the surfaces 58 on the outer periphery of the take-up reel 50. Continued driving of the take-up reel 50 then applies tension to the film causing the cassette 16 to pull the frame 20 toward the cutter mechanism 34. As the frame 20 moves a projection 33 actuates switch 30 causing the solenoid 45 to drive the cutter 40 through the film severing it from the short portion remaining connected to the cassette. The frame 20 is then returned by spring 24 to its initial position and it will trigger switch 31 causing the processor to initiate a processing cycle. During the processing cycle the reel 50 is driven and various chemicals are dispensed from a spout 61 into the reservoir 51. After predetermined intervals these chemicals are dumped from the reservoir. The reservoir 51 is pivotally mounted on an axis coaxial with the axis of the take-up reel 50 and the reservoir is dumped by actuation of a solenoid 63 which is connected through a pair of links 64 and 65 to pin 66 on the side wall of the reservoir. When the solenoid 63 is de-energized a spring 68, positioned about the link 64 between the solenoid 63 and the end thereof, returns the links to place the reservoir in an upright position awaiting insertion of another processing chemical. The film may undergo three or more baths for development.

A wall 70 is supported between the plates 11 and 12 to protect the solenoids 63 and other parts from droplets of the chemicals as the reel of film is rotated in the reservoir 51.

The illustrated device thus affords a mechanism for drawing film from a light-tight cassette, winding it onto a film reel for bathing the film, cutting the film from the cassette and sensing the completion of the threading operation.

Having thus disclosed the present invention with reference to a preferred embodiment it will be understood that various changes may be made without departing from the spirit of the invention as defined by the appended claims.

We claim:

1. A film handling mechanism for a processor comprising:
   a take-up reel for the film,
   drive means for the take-up reel;
   guide means for guiding film onto the take-up reel to wind the same thereon,
   means for supporting a film cassette for movement along a path toward and away from said take-up reel,
   cutter means positioned between said guide means and said means for supporting a film cassette to cut said film, and
   actuating means to actuate said cutter means in response to movement of said means for supporting said film cassette being moved toward said take-up reel.

2. A film handling mechanism according to claim 1 wherein said take-up reel is disposed in a reservoir for bathing the film.

3. A film handling mechanism according to claim 1 wherein said means for supporting said film cassette comprises
   a frame having a receptacle shaped to receive and support said film cassette,
   means slidably supporting said frame for movement toward and away from said take-up reel, and
   means biasing said frame from said take-up reel.

4. A film handling mechanism according to claim 3 wherein said actuating means to actuate said cutter means comprises
   a sensing member to sense the completion of film winding and movement of the frame, and
   switch means for energizing the cutter means in response to actuation by said sensing member.

5. A film handling mechanism according to claim 4 wherein said cutter means comprises
   a pair of cutter bars, one being mounted for movement across the film path toward the other, and
   a solenoid for moving said one of said cutter bars.

6. A film handling mechanism according to claim 2 wherein said reservoir is mounted for movement about an axis coaxial to the axis of said take-up reel and means are provided for rotating said reservoir about said axis to discharge chemical therefrom.

7. A film handling mechanism according to claim 6 wherein said guide means comprises a leader attached at one end to the take-up reel and having a coupling at the other end to be secured to the film and a pivotal chute mounted adjacent said take-up reel and positioned to extend between the reel flanges.

8. A film handling mechanism for a processor comprising:

guide means for defining a path for a film, drive means for drawing a film along said path, means for supporting a film cassette for movement along said path, cutter means positioned between said guide means and said means for supporting a film cassette to cut said film, and actuating means to actuate said cutter means in response to movement of said means for supporting said film cassette being moved toward said guide means.

* * * * *